United States Patent [19]

Morisawa et al.

[11] Patent Number: 4,616,526

[45] Date of Patent: Oct. 14, 1986

[54] TRANSMISSION DEVICE HOUSING CONSTRUCTION WITH SHAFT LUBRICATING OIL SHIELD COVER GENERATING LUBRICANT POOL

[75] Inventors: Kunio Morisawa; Tadashi Kondo, both of Toyota, Japan

[73] Assignee: Toyota Jidosha Kabushiki Kaisha, Aichi, Japan

[21] Appl. No.: 582,099

[22] Filed: Feb. 21, 1984

[30] Foreign Application Priority Data

Feb. 26, 1983 [JP] Japan .................. 58-031627
Mar. 9, 1983 [JP] Japan .................. 58-039745
Sep. 21, 1983 [JP] Japan .................. 58-174838

[51] Int. Cl.⁴ ............................................. F16H 57/04
[52] U.S. Cl. ................................................. 74/606 R
[58] Field of Search .................................... 74/606 R

[56] References Cited

U.S. PATENT DOCUMENTS

| | | | |
|---|---|---|---|
| 1,014,628 | 1/1912 | Lieber | 74/606 X |
| 1,144,331 | 6/1915 | Lower | 74/606 X |
| 1,155,163 | 9/1915 | Rice | 74/606 R |
| 2,276,561 | 3/1942 | Bloss | 74/606 R |
| 3,576,142 | 4/1971 | Matthews | 74/606 R |
| 4,068,541 | 1/1978 | Sakamoto et al. | 74/606 R X |
| 4,098,143 | 7/1978 | Kubo et al. | 74/606 R X |
| 4,242,923 | 1/1981 | Nishikawa et al. | 74/606 R X |
| 4,274,303 | 6/1981 | Shindo et al. | 74/606 R X |

FOREIGN PATENT DOCUMENTS

| | | | |
|---|---|---|---|
| 115657 | 9/1980 | Japan | 74/606 R |
| 2042101 | 9/1980 | United Kingdom | 74/606 R |

Primary Examiner—Gary L. Smith
Assistant Examiner—Rodney M. Lindsey
Attorney, Agent, or Firm—Parkhurst & Oliff

[57] ABSTRACT

A transmission device includes a casing elongated towards a power transfer aperture, a power output member rotatably supported in the aperture by a first bearing, and a power transfer shaft with an outer end rotationally coupled to the power output member and an inner part supported from the casing by a second bearing. The shaft has an axial aperture for receiving lubricating oil and a radial aperture communicating thereto for squirting out lubricating oil radially as the shaft revolves. An oil shield cover has a base mounted to the casing, an extension elongated under the shaft from the base towards the first bearing, an end wall reaching upwards from the end of the extension towards the shaft with the lowest point of its upper edge closely approached thereto at an axial position on the shaft at which its diameter is substantially less than where it is supported by the second bearing. The extension rises on either side of the shaft at least to the height of the lowest point of the upper edge of the end wall, and has an opening on its upper part corresponding to the radial aperture. A space for pooling lubricating oil ejected from the radial aperture is defined by the oil shield cover and the casing, and as lubricating oil accumulates therein it first can escape by overflowing over the end wall of the oil shield cover. The lubricating oil pool at this stage reaches high enough to wet the lower portion of the first bearing.

8 Claims, 9 Drawing Figures

TRANSMISSION DEVICE HOUSING CONSTRUCTION WITH SHAFT LUBRICATING OIL SHIELD COVER GENERATING LUBRICANT POOL

BACKGROUND OF THE INVENTION

The present invention relates to a housing construction for a transmission device, and more particularly relates to such a housing construction which can aid in the generation of a pool of lubricating oil in the lower part of the casing of the transmission device, which provides particularly good lubrication for a bearing through which rotational power passes between the outside and the inside of the transmission device. In particular, the present invention is suitable for application to a transmission system for a vehicle of the type in which, selectively, either the front wheels only can be powered, for use of the vehicle in relatively good road conditions such as on a paved road, or alternatively all four wheels can be powered, for use of the vehicle in relatively poor road conditions such as off the paved road surface. In such a vehicle, a power switching and transfer device is required which can switch the vehicle between single axle operation—i.e. front wheel drive only type operation—and double axle operation—i.e. front and rear wheel drive type operation or four wheel drive operation. Such a power switching and transfer device is subjected to heavy loads, and the problems of lubricating, in particular, the bearing which supports power output shaft for supplying rotational power to the rear wheels of the vehicle can become acute.

In detail, such a power switching and transfer device typically includes a power output shaft for outputting rotational power to the rear wheels of the vehicle, via a propeller shaft and a differential and rear axle assembly and so on, when and only when the vehicle is to be operated in four wheel drive mode, and this power output shaft is typically rotatably supported at its front end (with respect to the longitudinal axis of the vehicle) by a front end ball bearing fitted inside a forward portion of the housing of the power switching and transfer device and at its rear end by a rear end bearing or bush which is fitted inside a portion extending towards the rear of said housing. Thus, the front end of the power output shaft is selectively provided with supply of rotational power from some rotating member, such as an intermediate shaft, of the main transmission of the vehicle which powers the front wheels thereof, when powering of the rear wheels is also desired, and the rear end of the power output shaft is connected with regard to rotation to the front end of said propeller shaft. In order to provide stable support for this power output shaft, which typically is required to transmit great rotational torque and accordingly is required to be very securely rotationally mounted, the distance between said front end ball bearing and said rear end bearing is typically quite great.

Now, the lubrication for these bearings is conveniently provided by providing the intermediate shaft with an axially extending passage which communicates to the inside of a hole formed at the front end of the power output shaft. In its turn, the power output shaft is formed with one or more radially extending apertures, joining at their inner ends to said hole, which communicate to the outside of the power output shaft a little to the rearward direction of said front end ball bearing. Thus, when the power switching and transfer device is being operated to provide four wheel drive type operation, lubricating oil is supplied to the front end of this axial passage in the intermediate shaft, and this lubricating oil passes down the axial passage and to the hole in the front end of the power output shaft, and is then ejected through the radial passage or passages in said power output shaft as said power output shaft revolves, so that the majority of this lubricating oil is supplied to said front end ball bearing. Now, in the prior art, it has been relied upon that a sufficient amount of this lubricating oil will be transmitted so far as to reach the rear end bearing or bush, via the extension of the transmission housing supporting said rear end bearing, as to provide sufficient lubricating oil therefor; but this cannot be absolutely relied upon, and sometimes problems have arisen with respect to lubricating such a rear end bearing, leading in the extreme case to high wear and/or premature failure thereof. Particularly when the vehicle is being operated at low speed, or at low temperatures, this lubrication problem can be troublesome; and it is also aggravated in the period before the transmission lubricating oil has warmed up and while its viscosity is still great. Also, if the lubricating oil in the power switching and transfer device should become dirty and thick after a prolonged period of use of the vehicle without said lubricating oil being changed, then again the effectiveness of lubrication of the rear end bearing of the power output shaft can be undesirably deteriorated.

SUMMARY OF THE INVENTION

Accordingly, it is the primary object of the present invention to provide a housing construction for such a transmission device, which can provide good and assured lubrication for the rear bearing thereof.

It is a further object of the present invention to provide such a housing construction for such a transmission device, which provides good lubrication for the rear bearing even when the vehicle speed is low.

It is a further object of the present invention to provide such a housing construction for such a transmission device, which provides good lubrication for the rear bearing even when the temperature is low.

It is a further object of the present invention to provide such a housing construction for such a transmission device, which provides good lubrication for the rear bearing even when the temperature of the lubricating oil in the transmission device is still low because it has not yet warmed up.

It is a further object of the present invention to provide such a housing construction for such a transmission device, which provides good lubrication for the rear bearing even when the viscosity of the lubricating oil in the transmission device is high.

It is a yet further object of the present invention to provide such a housing construction for such a transmission device, which provides good lubrication for the rear bearing even when the lubricating oil in the transmission device has not been changed for an extended time.

It is a yet further object of the present invention to provide such a housing construction for such a transmission device, which ensures a long life for the transmission as a whole.

It is a yet further object of the present invention to provide such a housing construction for such a transmission device, which ensures high reliability of the transmission during use.

According to the most general aspect of the present invention, these and other objects are accomplished by, in a transmission device comprising: a casing elongated towards a power transfer aperture defined therein, a first bearing mounted in said power transfer aperture, a second bearing, a power output member rotatably supported in said power transfer aperture by said first bearing, and a power transfer shaft within said casing an outer end of which is rotationally coupled to said power output member and an inner portion of which is supported from said casing by said second bearing, said power transfer shaft being formed with an axially extending aperture for receiving supply of lubricating oil and with a radially extending aperture, communicating at its radially inward end to said axially extending aperture, for squirting out lubricating oil from said power transfer shaft in generally radial directions as said power transfer shaft revolves: a housing construction comprising a lubricating oil shield cover formed with: a base portion mounted to said casing at a position close to said second bearing on the side thereof towards said first bearing; an extension portion elongated from said base portion in the direction of said first bearing and positioned under said power transfer shaft; an end wall portion reaching upwards from the end in the direction of said first bearing of said extension portion towards said power transfer shaft with the lowest point of its upper edge closely approached thereto at an axial position along said power transfer shaft at which the diameter of said power transfer shaft is substantially less than it is at the axial part thereof at which said power transfer shaft is supported by said second bearing from said casing; said extension portion rising on either side of said power output shaft at least to the height of said lowest point of said upper edge of said end wall portion of said oil shield cover, and having an opening therein at a point not on the lowest part thereof and at an axial position corresponding to the axial position along said power output shaft of said radially extending aperture; a space for accumulating a pool of lubricating oil ejected from said radially extending aperture in said power transfer shaft being defined by said oil shield cover and said casing, so that as lubricating oil accumulates in said space it first can escape therefrom by overflowing over said lowest point of said upper edge of said end wall portion of said oil shield cover so as to flow to the upper side of the lower part of said extension portion of said oil shield cover, said lubricating oil pool at such a stage reaching so high as to wet the lower portion of said first bearing.

According to such a construction, as the power transfer shaft revolves, lubricating oil which is supplied to said axially extending aperture passes therealong and is supplied to the radially inward end of said radially extending aperture and is then squirted out from said power transfer shaft in generally radial directions. Some of this lubricating oil is expelled in a direction which allows it to pass through said opening in said extension portion of said oil shield, since said opening is at said axial position corresponding to the axial position along said power output shaft of said radially extending aperture. This lubricating oil then impinges against the inside of the casing and in particular against said elongated part thereof, and trickles theredown, to accumulate in said lubricating oil pool in said space which is defined by the oil shield cover and the casing, to such a height as to wet the lower portion of said first bearing. This is possible, because the extension portion rises on either side of said power output shaft at least to the height of said lowest point of said upper edge of said end wall portion of said oil shield cover, and thus the oil pool will not spill over the sides of the extension portion. The fact that the diameter of said power transfer shaft is substantially less at the axial position therealong at which said end wall portion is located, than it is at the axial position therealong at which said power transfer shaft is supported by said second bearing from said casing, is important for ensuring that the depth of this lubricating oil pool is sufficiently great. By this construction, it will be seen that the oil pool accumulates even at low vehicle speeds and low operating temperatures of the transmission, and even when the viscosity of the oil is high. Thus, even in these circumstances, in which as explained above problems existed in the prior art in lubricating such a bearing as the first bearing defined above, according to the present invention good and adequate lubrication of the first bearing can be reliably obtained. This accordingly prolongs the life of the transmission as a whole, and increases its reliability during use.

Further, according to a more particular aspect of the present invention, these and other objects are more particularly and concretely accomplished by such a housing construction as explained above, wherein said extension portion is shaped as a trough with the upper side thereof constituting said opening. In this case, a large amount of lubricating oil can be sprayed out from said radially extending aperture over the sides of said trough and upwards from said trough, to be supplied to said lubricating oil pool as explained above.

On the other hand, according to an alternative more particular aspect of the present invention, these and other objects are more particularly and concretely accomplished by such a housing construction as first explained above, wherein said extension portion is shaped as a tube with said opening therein at an intermediate axial position therealong. In this case, a lesser amount of lubricating oil is sprayed out from said extension portion through said hole, to be supplied to said lubricating oil pool as explained above.

Further, according to another more particular aspect of the present invention, these and other objects are more particularly and concretely accomplished by a housing construction as first described above, wherein said base portion comprises a portion shaped as a flat annulus, and wherein said base portion further comprises a short tubular portion the circumference of one end of which is joined to the outer circumference of said flat annular portion. According to such a construction, the short tubular portion can be wedged into a correspondingly shaped portion formed on the inside surface of the casing, so as firmly to fix the oil shield cover to said casing.

BRIEF DESCRIPTION OF THE DRAWINGS

The present invention will now be shown and described with reference to several preferred embodiments thereof, and with reference to the illustrative drawings. It should be clearly understood, however, that the description of the embodiments, and the drawings, are all given purely for the purposes of explanation and exemplification only, and are not intended to be limitative of the scope of the present invention in any way, since the scope of the present invention is to be defined solely by the legitimate and proper scope of the appended claims. In the drawings, like parts and features are denoted by like reference symbols in the various figures thereof, and:

DESCRIPTION OF THE PREFERRED EMBODIMENTS

Figure 1:
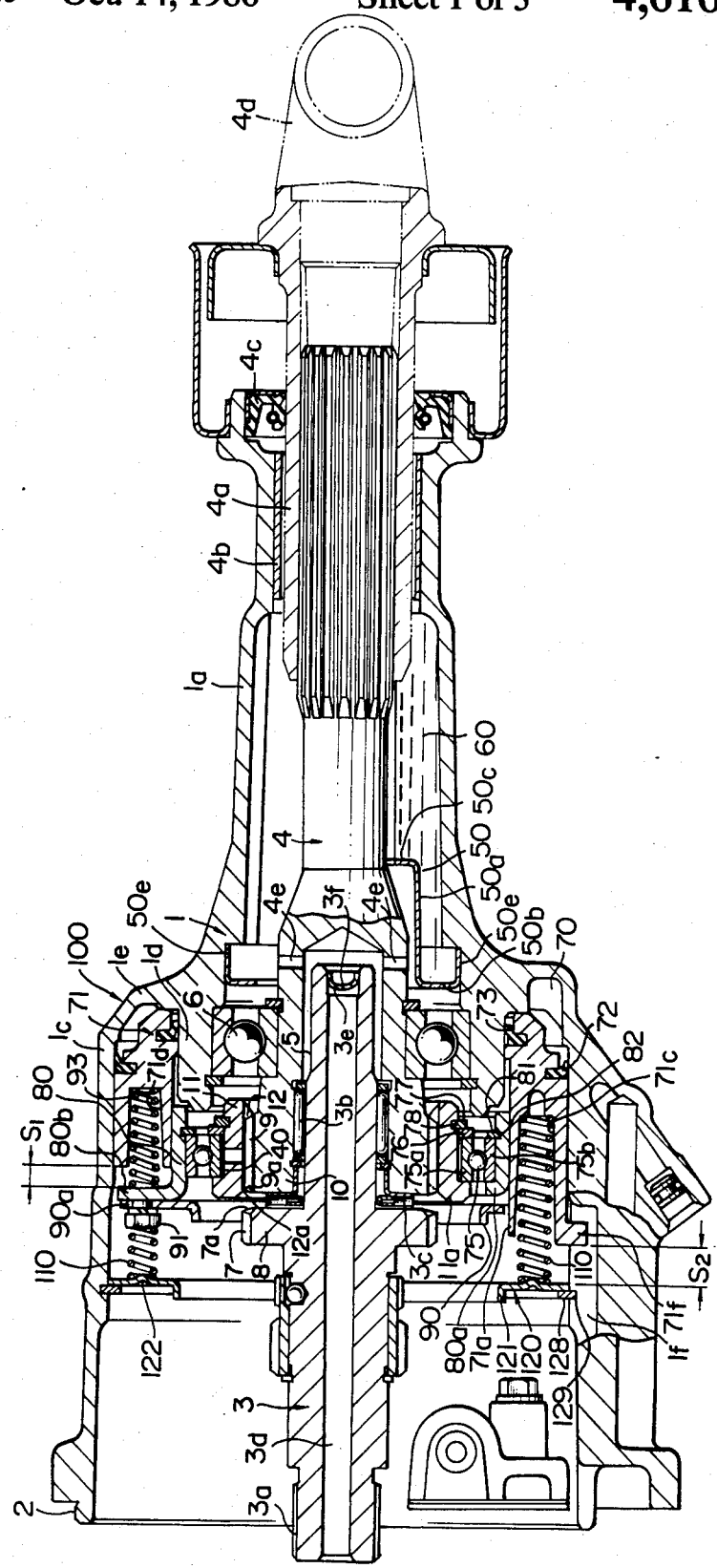
FIG. 1 is a longitudinal sectional view of a power switching and transfer device for use in a four wheel drive type vehicle, incorporating a housing construction which is the first preferred embodiment of the present invention.

The present invention will now be described with reference to several preferred embodiments thereof, and with reference to the appended drawings. FIG. 1 is a longitudinal sectional view of a power switching and transfer device, generally designated by the reference numeral 100. This device 100 has a housing 1, which is formed as an extension housing adapted to be secured to a transmission, not shown in the figures, of an automotive vehicle by a connecting surface 2 at the left hand side of said housing 1 in the figure (corresponding to the front end thereof with regard to the longitudinal axis of the vehicle). In fact, this vehicle is of the type described hereinbefore in which, selectively, either the front wheels only can be powered, for use of the vehicle in relatively good road conditions such as on a paved road, or alternatively all four wheels can be powered, for use of the vehicle in relatively poor road conditions such as off the paved road surface; and this power switching and transfer device 100 is the means for thus selectively providing rotary power to the rear wheels of the vehicle, as will be explained in detail later. This device 100 incorporates a housing construction which is the first preferred embodiment of the housing construction of the present invention.

In detail, the transmission system (not shown) to which the device 100 is fixed by the connecting surface 2 comprises a gearbox, a front axle differential, drive shafts, constant velocity joints, and so on, and is so constituted as always to provide rotary power to the front wheels of the vehicle, of course when the engine is being appropriately driven. Also, this transmission system provides an uninterrupted supply of rotary power to the left hand end in the figure of an intermediate shaft 3 of the power switching and transfer device 100, said left hand end of said shaft 3 being located generally in the plane of said connecting surface 2 and being provided with splines 3a for engaging with and being supported by some appropriate rotating member, not particularly shown, of said transmission. The right hand end portion of said intermediate shaft 3 is inserted into an axial hole 5 formed in the left hand end in the figure of a power output shaft 4, and is rotatably supported therein with regard to sidewise or radial movement by a needle roller bearing 3b. Further, this intermediate shaft 3 is provided at its portion just to the left of its said right hand end with an integrally formed first dog clutch member or toothed wheel 8, which bears outer teeth 7 for providing dog clutch action as will be seen hereinafter, the right hand ends in the figure of these teeth 7 being formed as chamfered portions 7a; and between said first dog clutch member 8 and the left hand end of the power output shaft 4 there is provided a thrust bearing construction 3c of a per se well known type incorporating needle rollers for supporting axial pressure therebetween.

The power output shaft 4 is supported near its left end in the figure from the housing 1 by a ball bearing 6 fitted therebetween, and projects to the right in the figure along inside the central hole in an extended projecting portion 1a of the housing 1 defined to the right in the figure of the ball bearing 6 and into an axial hole formed in the end of a power output member 4a, being rotationally engaged to said power output member 4a by splines. This power output member 4a is rotatably supported in the right hand end of the projecting portion 1a of the housing 1 by a bearing 4b, and projects out from the right hand end of said projecting portion 1a of said housing 1, being then coupled to a universal joint device 4d (only schematically shown) which (for example) leads to a propeller shaft which in turn leads to a differential which transfers power to the rear wheels of the vehicle. An oil seal 4c is provided between the power output member 4a and the projecting portion 1a of the housing 1 to prevent escape of lubricant from said housing 1.

The left hand end of the power output shaft 4 is also provided with an integrally formed second dog clutch member or toothed wheel 10, which is of the same diameter as the first dog clutch member 8 and is directly axially opposed thereto, and which likewise bears outer teeth 9 for providing dog clutch action, of the same number as the teeth 7 and identically spaced, the left hand ends in the figure of these teeth 9 being formed as chamfered portions 9a. A dog clutch sleeve member 11 of a tubular shape bearing inner teeth 12 is fitted over the first and second dog clutch members 8 and 10 and is slidable thereon in the left and right directions in the figure. The left and right hand ends in the figure of these teeth 12 are formed as chamfered portions 12a. Thus, when the sleeve member 11 is slid to the right, i.e. is in the position shown in FIG. 1, it does not rotationally couple together the first dog clutch member 8 and the second dog clutch member 10, and thus the intermediate shaft 3 is not rotationally coupled to the power output shaft 4, thus leaving the vehicle in the two wheel drive type operational mode in which the front wheels only thereof are powered; but, on the other hand, when the sleeve member 11 is slid to the left from the position shown in FIG. 1, it rotationally couples together the first dog clutch member 8 and the second dog clutch member 10 via the outer teeth 7 and 9 formed on them which are rotationally engaged with the inner teeth 12 formed on the sleeve member 11, and thus the intermediate shaft 3 is rotationally coupled to the power output shaft 4, and rotational power is transmitted therethrough from the gearbox of the vehicle (not shown) to the rear wheels thereof, thus providing four wheel drive operation for the vehicle in which the rear wheels thereof are powered as well as the front wheels.

A central axial oil hole designated by the reference numeral 3d is formed as extending down the length of the intermediate shaft 3, and the right hand end in the figure of this axial oil hole 3d is closed by a cap 3e, through which a small orifice 3f is pierced. Thus, while the vehicle is being operated, lubricating oil passes from the interior of the gearbox (not shown) of the vehicle down through this oil hole 3d in the rightwards direction as seen in the figure, and passes out through the orifice 3f in the cap 3e in a flow amount determined by the size of said orifice 3f, to enter into the hole 5 formed in the power output shaft 4. From this hole 5, some of this lubricating oil flows leftwards in the figure past the roller bearing 3b and the thrust bearing 3c, while lubricating them, to then lubricate the various dog clutch mechanisms within the casing 1, while on the other hand the remainder of this lubricating oil passes through a plurality of radially extending orifices 4e formed in the power output shaft 4 and communicating to the hole 5, to pass to the outside of the power output shaft 4; the subsequent path of this transmitted lubricating oil will be explained later.

The arrangements for driving the sleeve member 11 in the left and right directions in FIG. 1, so as thus to selectively either engage four wheel drive for the vehicle or to leave only two wheel drive engaged, will now be described.

The portion of the housing 1 around the sleeve member 11 is formed so as to define a cylindrical pressure chamber 70 by the cooperation of an outer cylindrical portion 1c and an inner cylindrical portion 1d which extends from a base portion 1e coaxially within said outer cylindrical portion 1c. The pressure chamber 70 is coaxial with the intermediate shaft 3 and the power output shaft 4. A conduit not shown in the figure is provided for selectively providing pressurized hydraulic fluid to said pressure chamber 70. An annular piston 71 (shown in detail in FIG. 2) is slidably mounted in said pressure chamber 70, so as to be able to move in the left and right directions in FIG. 1 according to the pressure in said pressure chamber 70, and an external seal 72 and an internal seal 73 are provided on the side of the piston 71 towards the pressure chamber 70 for ensuring that hydraulic fluid cannot escape in substantial quantity from the pressure chamber 70 to the inside of the casing 1. The piston member 71 is formed with a protrusion 71f extending radially outwards from its left hand end in the figures, and this protrusion 71f engages with a groove 1f formed in the inner shape of the casing 1, so that the piston member 71 is prevented from rotating in the casing 1, although of course it can axially reciprocate therein.

The inner part of this annular piston 71 is constrained with regard to movement in the axial direction with respect to the sleeve member 11, while on the other hand being freely rotatable with respect thereto, by a construction which will now be described.

The inner race 75a of a radial ball bearing 75 is secured around the outer surface of the dog clutch sleeve 11 by being fitted over said outer surface and by being squeezed between a step 11a defined on said outer surface of the clutch sleeve 11 and a collar 76, which is held in place by a snap ring 77 which is snappingly fitted into a circumferential groove 78 formed in said outer surface of said clutch sleeve 11. A certain radial gap 40 is left between the inner surface of said inner race 75a of said radial ball bearing 75 and the outer surface of said clutch sleeve 11, so as to be able to absorb misalignment of the various parts. The outer race 75b of this radial ball bearing 75 is secured within the inner cylindrical surface of a drive member 80 by being fitted into said inner cylindrical surface and by being squeezed between a plurality of inwardly extending ear portions 80a projecting inwards from said inner cylindrical surface of the drive member 80 and a snap ring 81, which is held in place by being snappingly fitted into a circumferential groove 82 formed in said inner cylindrical surface of said drive member 80. Thus, the drive member 80 is fixed to the sleeve member 11 with regard to movement in the axial direction, while on the other hand being freely rotatable with respect thereto by the rotating action of the ball bearing 75.

Figure 2:
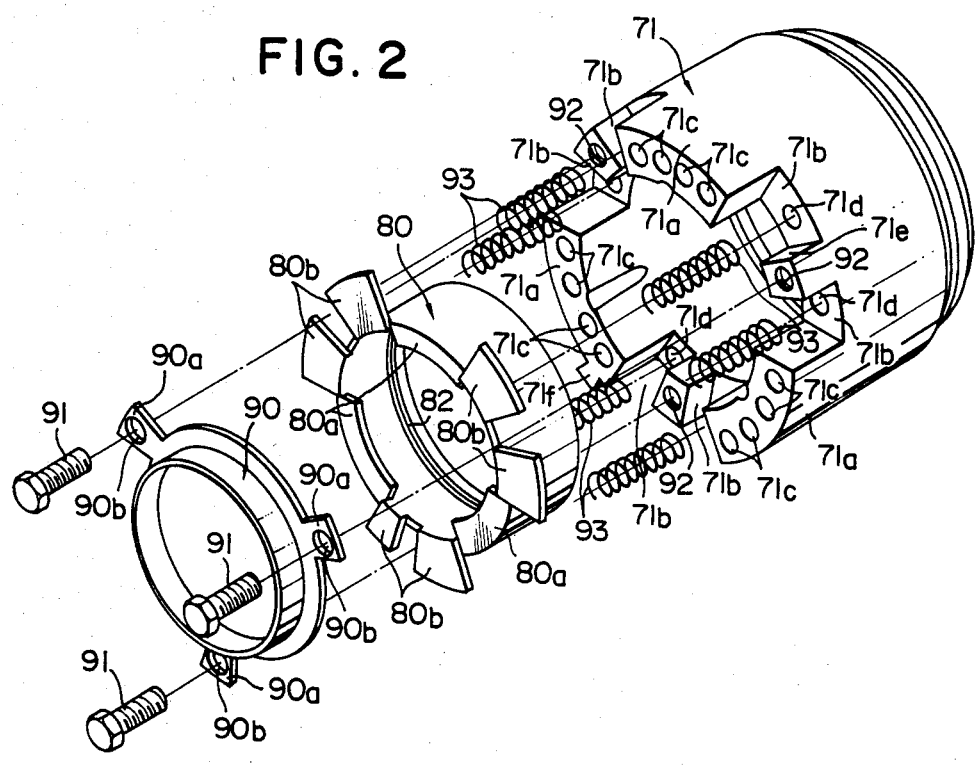
FIG. 2 is a perspective view of an annular piston member utilized in said power switching and transfer device, along with a drive member and a stop member and various auxiliary parts.

This drive member 80 is best seen in FIG. 2, which is a perspective view thereof along with the annular piston member 71 and with a stop member 90 which will be explained hereinafter and with various auxiliary parts. Here it will be seen that the drive member 80 is formed generally as a hollow cylindrical member, but with, at its left hand end in the figures, said plurality of inwardly extending ear portions 80a, and also a plurality of outwardly extending ear portions 80b. The outward ear portions 80b fit each into a corresponding notch shape 71b provided as formed in the left hand end in the figures of the annular piston member 71, these notch shapes being defined between alternate wide axial protrusions 71a and narrow axial protrusions 71e extending from the left hand end in the figures of said annular piston member 71, with the outer surface of the main cyindrical body of the drive member 80 fitting within the inner surface of the inner hole of the annular piston member 71 and sliding thereagainst, so that the piston member 71 is able to move in the axial direction with respect to the drive member 80 but is not able to rotate with respect thereto. The stop member 90 is formed as a flat annular ring with a cylindrical annular ring secured to its inner circumference and with a plurality of outwardly protruding ear portions 90a with holes 90b formed therein; and this stop member 90 is secured to the ends in the left hand direction in the figures of the narrow axial protrusions 71e of the piston member 71 by bolts 91 which pass through the holes 90b of the ear portions 90a and are screwed into bolt holes 92 formed in said protrusions 71e. Thus, the stop member 90 positively prevents the drive member 80 from coming away from the piston member 71, by trapping the outwardly protruding ear portions 80b of the drive member 80 in the notch shapes 71b of the piston member 71.

Between the outwardly protruding ear portions 80b of the drive member 80 and the notch shapes 71b of the piston member 71 are provided biasing compression coil springs 93, the one ends of which bear against the inner sides of the ear portions 80b, and the other ends of which are seated inside blind holes 71d formed in the bottoms of the notch shapes 71b, so as to hold said compression coil springs 93 in place with a certain prestressing being provided. Thereby, the drive member 80 is biased in the leftwards direction in the figures with respect to the piston member 71, its movement in this direction however being limited by the provision of the stop member 90. In FIGS. 1 and 2, the depth of the notch shapes 71b in the piston member 71 is indicated to be S1, which is accordingly the amount of biased relative motion available between said piston member 71 and said drive member 80.

The annular piston 71 and the drive member 80 and the sleeve member 11, etc., are biased in the rightward direction in the figure, i.e. in the direction to reduce the volume of the annular pressure chamber 70, and are also limited with respect to the total distance through which they can travel axially, by a biasing construction which will now be described.

Each of the wide axial protrusions 71a of the annular piston 71 is formed with several (four in the shown preferred embodiment) axially extending blind holes 71c, and into each of these blind holes 71c is fitted one end of one of a plurality of return compression coil springs 110. The other ends of these return compression coil springs 110 bear against an annular spring seat member 120, which is particularly shown in FIGS. 3 through 5, and which is fixed relative to the casing 1 of the power switching and transfer device 100. Thus, the total distance through which the annular piston 71 can move is as shown by S2 in FIG. 1 (the piston 71 is shown at its extreme rightmost position in FIG. 1); and the piston 71 is biased in the rightwards direction in the figure by the return compression coil springs 110. Particularly, for reasons which will become clear later, the distance S2 is arranged to be substantially greater than the above defined distance S1, and also the total biasing force which the return compression coil springs 110 exert on the piston 71 is arranged to be substantially less than the total biasing force on said piston exerted by the buffer compression coil springs 93: this is done by ensuring that the prestressing of the return compression coil springs 110 is substantially less than the prestressing of the buffer compression coil springs 93, and also that the spring constant of the return compression coil springs 110 is substantially less than the spring constant of the buffer compression coil springs 93.

Figure 3:
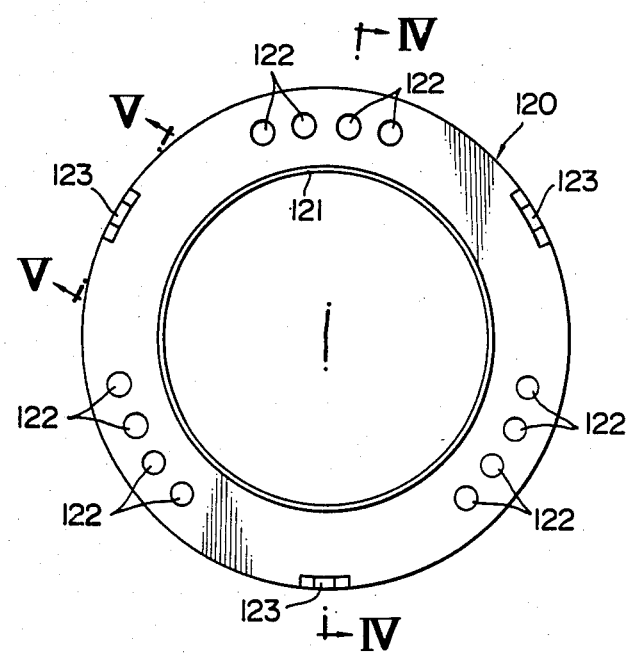
FIG. 3 is a plan view of an annular spring seat member used for seating certain return springs in said power switching and transfer device shown in FIGS. 1 and 2.
Figure 4:
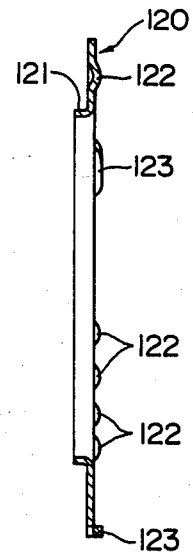
FIG. 4 is a sectional view of said spring seat member taken in a plane containing the central axis thereof and indicated by the arrows IV—IV in FIG. 3.
Figure 5:
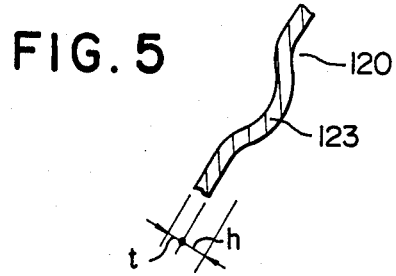
FIG. 5 is a sectional side view of an outer peripheral portion of said spring seat member including an axially extending protrusion formed thereon, and indicated by the arrows V—V in FIG. 3.

In detail, FIG. 3 shows a plan view of the spring seat member 120, FIG. 4 is a sectional view of said spring seat member 120 taken in a plane indicated by the arrows IV—IV in FIG. 3, i.e. in a plane containing the central axis thereof, and FIG. 5 is a sectional side view of an outer peripheral portion of said spring seat member 120 including an axially extending protrusion 123 formed thereon and taken in a plane indicated by the arrows V—V in FIG. 3. This spring seat member 120 is formed of a piece of bent sheet metal of thickness denoted in the figure by "t", and is made as a flat annulus with a pressed short cylindrical annular portion 121 at its central portion for reinforcement purposes. The outer periphery of this spring seat member 120 is located just to the right in the figure of a snap ring 128 which is fitted into a circumferential snap ring groove 129 formed in the inner surface of the casing 1, and is pushed against said snap ring 128 by the pressing action of the return compression coil springs 110. Thereby the spring seat member 120 is kept in place, when the device has been assembled. Typically, as suggested in the figure, the widths of the snap ring 128 and of the snap ring groove 129, i.e. their axial extents, are greater than the thickness "t" of the material of the spring seat member 120.

On the flat annular portion of the spring seat member 120 there are formed a plurality of pressed protrusions 122, each corresponding to one of the plurality of return compression coil springs 110, for fitting into and locating and keeping in place the left hand ends in the figure of said return compression coil springs 110. These protrusions 122 may be of any convenient height, i.e. axial extent. Further, according to a special novel constructional feature, also on the outer circumference of the spring seat member 120 there are formed a plurality of axially extending protrusions 123 of height approximately as shown by "h" in FIG. 5, which in the shown particular construction are formed by pressing a portion of the material of the peripheral portion of the annular spring seat member 120 out of its general plane for about said certain distance "h", and which extend in the same axial direction as do the protrusions 122. This height "h" of the protrusions 123 is so arranged that the sum t+h of said height of said protrusions 123 and the thickness of the material of the spring seat member 120 is greater than the axial thickness of the snap ring 128 and the corresponding snap ring groove 129.

Thus, when the power switching and transfer device 100 is being assembled into its casing 1, after the parts including the annular piston 71 and the drive member 80 and the sleeve member 11, etc. having been fitted into the casing 1 from its open left hand end as seen in FIG. 1, then the return compression coil springs 110 are fitted into the blind holes 71c of the piston 71. Next, the spring seat member 120 is inserted into the casing 1 and approached to these springs 110, with each of said springs 110 resting against its corresponding protrusion 122, and then said spring seat member 120 is pressed squarely towards the piston member 71 (which naturally at this time is at the bottom of its travel in the pressure chamber 70), so as to evenly compress the compression coil springs 110. When the spring seat member 120 has been thus pressed in the right hand direction in the figure so far as to have passed the snap ring groove 129 formed on the inside of the casing 1, then the snap ring 128 is fitted into said groove 129 and released, and subsequently the spring seat member 120 can be released so as by the biasing action of the compression coil springs 110 to be held against said snap ring 128. Now if, during this assembly process, the spring seat member 120 should undesirably slip sideways, despite its location by the projections 122 engaging with the return compression coil springs 110, then because of the provision of the protrusions 123 said spring seat member 120 cannot enter into or become engaged with the snap ring groove 129, because as mentioned above the total axial thickness of said spring seat member 120 at its portions incorporating said protrusions 123 is too great to enter into said snap ring groove 129, but instead always advances, being guided by the inner surface of the casing 1. This is very helpful for ensuring good assemblage of the power switching and transfer device 100 as a whole, since such slipping of a return spring seat member into the snap ring groove for the snap ring that is supposed to retain the return spring seat member is a well known problem associated with the assembly of transmission devices in general. Thus, this simple and ingenious construction incorporating the protrusions 129 positively avoids this assembly difficulty, and thus greatly facilitates the putting together of the shown power switching and transfer device. It should be noted that this concept is also applicable, mutatis mutandis, to the case in which the snap groove is an external groove on a shaft, and the spring seat member is held by its internal periphery, as well as to the shown case in which the snap groove is an internal groove on the transmission device casing, and the spring seat member is held by its external periphery.

This means for driving the sleeve member 11 in the left and right directions in FIG. 7 functions as follows.

The position of the apparatus illustrated in FIG. 1 is that in which the annular piston 71 is at its extreme position to the right in the figure, i.e. towards the rear of the vehicle incorporating the transmission device, with the pressure chamber 70 at its smallest volume, because of the biasing action of the return compression coil springs 110, and with the distance between the ear portions 80b of the drive member 80 and the bottoms of the notch shapes 71b in the piston member 71 substantially equal to S1, i.e. with the drive member 80 displaced to its maximum extent leftwards in the figure with respect to the piston 71, under the biasing influence of the buffer compression coil springs 93. At this time the drive member 80 is holding, via the ball bearing 75, the sleeve member 11 in the position shown in the figure in which the inner teeth 12 of said sleeve member 11 are only engaged with the outer teeth 9 of the second dog clutch member 10 integrally formed on the end of the power output shaft 4, and are not engaged with the outer teeth 7 of the first dog clutch member 8 integrally formed on the end of the intermediate shaft 3. Thus, in this state, as explained previously, the sleeve member 11 does not rotationally couple together the first dog clutch member 8 and the second dog clutch member 10, and thus the intermediate shaft 3 is not rotationally coupled to the power output shaft 4, and thus the vehicle is left in its two wheel drive type operational mode in which the front wheels only thereof are powered. Now, in order to engage the four wheel drive operational mode in which the rear wheels also are powered, the pressure chamber 70 is supplied with pressurized hydraulic fluid via the means for doing so not shown in the figures, and this causes the annular piston 71 to be pushed to the left in FIG. 1 in a progressive manner.

For the first part of the movemeCnt of said annular piston 71, the return compression coil springs 110 only are compressed, because they are weaker than the buffer compression coil springs 93 and because the sliding of the sleeve member 11 on the second dog clutch member 10 (i.e. the sliding together of the respective teeth 12 and 9 thereof) takes place without any substantial resistance therebetween; and thus the distance S1 between the ear portions 80b of the drive member 80 and the bottoms of the notch shapes 71b in the piston member 71 remains substantially constant, and the drive member 80 is moved to the left in FIG. 1 together with the piston 71 by substantially the same amount, with the sleeve member 11 being likewise moved by substantially the same amount to the left in the figure by being pushed by the drive member 80 via the ball bearing 75, which is well able to transmit such axial pushing. As this occurs, since the sleeve member 11 is held from the drive member 80 via the ball bearing 80 which supports it uniformly around its entire circumference, the sleeve member 11 is moved while being held straight, and no tendency exists for the central axis of the sleeve member to become twisted or slanted with respect to the central axis of the intermediate shaft 3 and the power output shaft 4, in contrast to what is the case with a conventional type of construction in which the sleeve member 11 is held from the drive member 80, for example, via a fork type construction. This advantage is obtained by having the connecting construction between the drive member 80 and the sleeve member 11 be a rotationally symmetrical or isotropic construction.

This first stage of movement of the piston 71 continues until the chamfered portions 12a on the left hand ends in FIG. 1 of the inner teeth 12 of the sleeve member 11 come into contact with the chamfered portions 7a on the right hand ends in FIG. 1 of the outer teeth 7 of the first dog clutch member 8. Assuming that the engagement between these teeth is not exact, which will be the typical case, a severe resistance is then presented to the further movement of the sleeve member 11 to the left in the figure, and as the piston 71 is further driven to the left by the further supply of pressurized hydraulic fluid to the pressure chamber 70 now the buffer compression coil springs 93 will be started to be compressed, with the drive member 80 and the ball bearing 75 and the sleeve member 11 no longer moving to the left although the piston 71 is still moving to the left. As this movement progresses, the ear portions 80b of the drive member 80 move towards the bottoms of the notch shapes 71b in the piston member 71 as the buffer compression coil springs 93 continue to be compressed with the pressure between the chamfered portions 12a of the inner teeth 12 of the sleeve member 11 and the chamfered portions 7a of the outer teeth 7 of the first dog clutch member 8 steadily increasing. This process continues, with the pressure between the teeth 12 and the teeth 7 increasing, until these teeth engage together due to relative rotation between the intermediate shaft 3 and the power output shaft 4, i.e. until the teeth 7 enter between the teeth 12 and start to slide therebetween (and vice versa) with the sleeve member 11 again moving to the left in FIG. 1. Again, during this steady increase of the pressure between the sleeve member 11 and the first dog clutch member 8, the fact that the sleeve member 11 is being offered up squarely to the dog clutch member 8 and is being uniformly pressed thereagainst, which is a consequence as explained above of the use of a ball bearing 75 for connecting between the drive member 80 and the sleeve member 11, rather than a non rotationally symmetric construction such as a fork construction being employed, is very helpful for ensuring smooth and good eventual engagement of the teeth 12 and the teeth 9 together.

In fact, during this process of increasing the pressure between the chamfered portions 12a of the inner teeth 12 of the sleeve member 11 and the chamfered portions 7a of the outer teeth 7 of the first dog clutch member 8, if the resistance presented by the clash between the teeth 12 and 7 should be sufficiently great, then it may happen that the ear portions 80b of the drive member 80 may reach the bottoms of the notch shapes 71b in the piston member 71 with the buffer compression coil springs 93 compressed to their maximum possible extent; and then no further buffer action is available from these buffer springs 93, and the force subsequently exerted by the piston 71 is directly transmitted to the clashing engagement between the inner teeth 12 of the sleeve member 11 and the outer teeth 7 of the first dog clutch member 8, thus quickly forcing these teeth to become engaged together by a substantial increasing of the pressure therebetween. Further, it will be easily understood that as soon as these teeth 12 and 7 have started to become engaged together, the resistance to motion of the sleeve member 11 to the left in FIG. 1 will immediately be much diminished, and accordingly the compression of the buffer compression coil springs 93 will be suddenly released and the sleeve member 7 will be quickly pushed to the left in the figure, thus quickly completing the engagement between the sleeve member 11 and the first dog clutch member 8. This causes the intermediate shaft 3 to become rotationally coupled to the power output shaft 4, and thus rotational poer is transmitted therethrough from the gearbox of the vehicle (not shown) to the rear wheels thereof, thus providing four wheel drive operation for the vehicle in which the rear wheels thereof are powered as well as the front wheels.

Even after rotational power has thus started to be transmitted through the teeth 12 and 7 from the intermediate shaft 3 to the power output shaft 4, the engagement between the teeth 12 and 7, i.e. between the sleeve member 11 and the first dog clutch member 8, may remain to be completed by further sliding of the sleeve member 11 to the left in the figure. In this case, the force required to move the sleeve member to the left may be considerably great, because of the friction caused between the teeth 12 and 7 by the power being transmitted therebetween. But, in any case, the pushing of the piston 71 will be sufficiently strong to accomplish this full engagement, if necessary with further compression of the buffer compression coil springs 93, perhaps even to the maximum extent described above in which the ear portions 80b of the drive member 80 reach the bottoms of the notch shapes 71b in the piston member 71. This is the reason that the maximum travel of the piston member, designated as S2, is set to be substantially greater than the distance S1, which is the maximum travel of the drive member 80 relative to the piston member 71, as defined above.

Finally, of course, when it is desired to disengage the four wheel drive type operational mode of the vehicle and to return to the two wheel drive type operational mode, simply the supply of pressurized hydraulic fluid to the pressure chamber 70 is discontinued, and then the return compression coil springs 110 will drive the piston member 70, the drive member 80, the ball bearing 75, and the sleeve member 11 rightwards in FIG. 1, thus disengaging the teeth 12 of the sleeve member 11 from the teeth 7 of the first dog clutch member 8 and allowing the intermediate shaft 3 and the power output shaft 4 to become rotationally disconnected. Again, the smooth and rotationally uniform holding action of the ball bearing 75 allows this disengagement to be performed smoothly without canting of the sleeve member 11 to one side or the other, such as might be the case if a fork arrangement were used for actuating the sleeve member 11.

Now, the path which the lubricating oil which has passed in the radially outward direction through the plurality of radially extending orifices 4e formed in the power output shaft 4 subsequently pursues, and the arrangements relating to said path, which matters are particularly related to the gist of the present invention, will be explained.

Figure 6A:
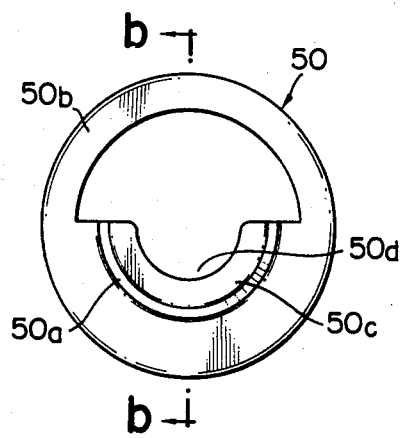
FIG. 6 illustrates, with regard to this first preferred embodiment of the housing construction of the present invention, the construction of a lubricating oil shield cover which is fitted around a portion of a power output shaft so as to cause a lubricating oil pool to be formed therebelow, and shows in view (a) this oil shield cover end on, and in view (b) a sectional view thereof taken in a plane indicated by the arrows "b" in view (a)
Figure 6B:
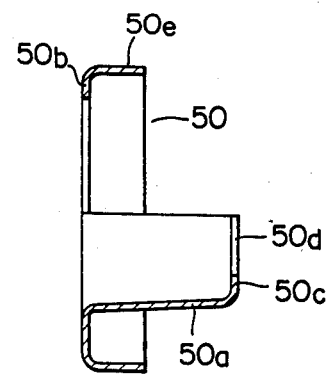

This oil sprays out in all radial directions upwards, downwards, and sideways from the orifices 4e as the power output shaft 4 rotates. A lubricating oil shield cover 50, the construction of which in this first preferred embodiment of the present invention is illustrated in FIG. 6, is fitted around the portion of the power output shaft 4 just to the right in the figure of the ball bearing 6. In view (a) of FIG. 6, this oil shield cover 50 is seen end on as from the right in FIG. 1, and in view (b) of FIG. 6 a sectional view thereof is shown taken in the plane indicated by the arrows "b" in view 6(a). This oil shield cover 50 of this first preferred embodiment comprises a half tubular portion 50a, a base flange portion 50b formed as a flat annulus to half of whose circular inner periphery is joined the half circular periphery at one end of said half tubular portion 50a, an end wall portion 50c which is formed as half of a flat annulus to whose outer half circular periphery is joined the half circular periphery at the other end of said half tubular portion 50a (the semicircular notch in the middle of said end wall portion 50c being denoted in the figures by the reference symbol 50d), and a base fitting portion 50e, which is a short tubular portion of large radius one circular end periphery of which is joined to the outer circular periphery of said base flange portion 50b. As indicated in FIG. 1, this oil shield cover 50 is fitted around the power output shaft 4 just to the right in the figure of the ball bearing 6, with the base flange portion 50b facing towards the ball bearing 6, and with the outer surface of the base fitting portion 50e wedged in a lubricating oil sealing manner into a corresponding tubular shape defined on the inside surface of the casing 1, so as to hold the oil shield cover 50 with its half tubular portion 50a extending in the rightwards direction in the figure and positioned partly around the power output shaft 4 and circularly oriented so as to be at the bottom thereof. In this position, the semicircular notch 50d in the middle of said end wall portion 50c receives closely the portion of the power output shaft 4 axially adjacent thereto; in other words, the inner diameter of the half annular end wall portion 50c is only a little larger than the diameter of the power output shaft at its portion axially corresponding thereto. Particularly according to the concept of the present invention, the diameter of the power output shaft 4 at this portion thereof is substantially less than its diameter at its portion which is supported by the ball bearing 6.

With this construction, therefore, the lubricating oil which is sprayed out in radial directions below the horizontal from the orifices 4e as the power output shaft 4 rotates impinges against the inner surface of the half tubular portion 50a of the cover 50 and accumulates therein and then (being barred from rightwards flow by the end wall portion 50c) flows to the left in the figure towards the ball bearing 6 to pass therethrough into the construction comprising the dog clutch described above, etc.. On the other hand, the lubricating oil which is sprayed out in radial directions above the horizontal from the orifices 4e as the power output shaft 4 rotates misses the half tubular portion 50a of the cover 50 and instead impinges against the upper inner surface of the projecting portion 1a of the housing 1. Part of this lubricating oil of course drips down directly to land within the upwardly facing trough defined by the half tubular portion 50a, to flow as before towards and through the ball bearing 6; but quite a large proportion of this lubricating oil on the other hand trickles down the inner surface of the projecting portion 1a of the housing 1 and accumulates in a pool 60 within said projecting portion 1a, since as explained previously the wedging contact between the outer surface of the base fitting portion 50e of the cover 50 and the corresponding tubular shape defined on the inside surface of the casing 1 is substantially fluid tight. The level of this pool 60 of lubricating oil rises until it reaches the lowest portion of the periphery of the semicircular notch 50d in the middle of the end wall portion 50c, as illustrated in FIG. 1; of course, subsequent rise of the level of said pool 60 is prevented by spilling of lubricating oil over said end wall portion 50c into the inside of the trough defined by the half tubular portin 50a. This oil pool 60, as shown in the figure, reaches so high as to wet the lower part of the bearing 4b which supports the right hand end of the power output member 4a in the projecting portion 1a of the housing 1, and accordingly provides very good and positive lubrication for said bearing 4b. Since, as explained above, according to the concept of the present invention, the diameter of the power output shaft 4 at the portion thereof axially corresponding to the end wall portion 50c, and accordingly the inner diameter of the half annular end wall portion 50c (i.e. of the notch 50d thereof), is substantially less than the diameter of the power output shaft 4 at its portion which is supported by the ball bearing 6, therefore the level of the oil pool 60 is enabled to be sufficiently high.

Thus, it will be seen that this oil pool 60 accumulates even at low vehicle speeds and low operating temperatures of the transmission, and even when the viscosity of the lubricating oil is relatively high as when it is still cold or when it has not been changed for a long period of time, and accordingly even in these circumstances, in which as explained above problems existed in the prior art in lubricating such a rear bearing as the bearing 4b, according to the present invention good and adequate lubrication of the rear bearing 4b can be reliably obtained. This accordingly prolongs the life of the transmission as a whole, and increases its reliability during use.

Figure 7A:
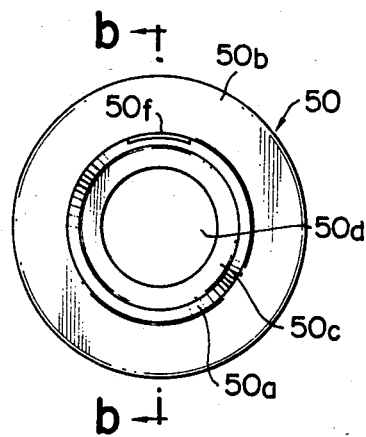
FIG. 7 is similar to FIG. 6, again consisting of views (a) and (b), and similarly illustrates a lubricating oil shield cover in a second preferred embodiment of the housing construction of the present invention.
Figure 7B:
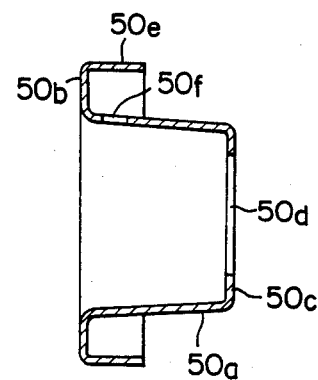

FIG. 7 shows the oil shield cover 50 in a second preferred embodiment of the housing construction according to the present invention. In this figure, parts of said shown oil shield cover of the second preferred embodiment, which correspond to parts of the oil shield cover of the first preferred embodiment shown in FIGS. 1 and 2, and which have the same functions, are designated by the same reference numerals and symbols as in those figures. The rest of the construction of the second preferred embodiment is not shown because it is substantially the same as in the case of the first preferred embodiment. The views (a) and (b) of FIG. 7 show the oil shield cover 50 of the second preferred embodiment of the present invention in substantially the same way as the views (a) and (b) of FIG. 6 relating to the first preferred embodiment.

In this second preferred embodiment, the oil shield cover 50 of this second preferred embodiment is shown as comprising a tubular portion 50a, a base flange portion 50b formed as a flat annulus to whose circular inner periphery is joined the circular periphery at one end of said tubular portion 50a, an end wall portion 50c which is formed as a flat annulus to whose outer circular periphery is joined the circular periphery at the other end of said tubular portion 50a (the circular hole in the middle of said end wall portion 50c being denoted in the figures by the reference symbol 50d), and a base fitting portion 50e, which is a short tubular portion of large radius one end circular periphery of which is joined to the outer circular periphery of said base flange portion 50b. Further, the tubular portion 50a is pierced with a relatively small hole 50f at an axial position therealong which, when as in the case of the first preferred embodiment shown in FIGS. 1 and 2 this oil shield cover 50 is fitted around the power output shaft 4 just to the right of the ball bearing 6 with the base flange portion 50b facing towards the ball bearing 6 and with the outer surface of the base fitting portion 50e wedged in a lubricating oil sealing manner into the corresponding tubular shape defined on the inside surface of the casing 1 so as to hold the cover 50 with its tubular portion 50a extending in the rightwards direction in the figure around the power output shaft 4, substantially corresponds in its axial position to the axial position of the orifices 4e. When so fixed as described above, this hole 50f is set to be at the top of the tubular portion 50a; and at this time the circular hole 50d in the middle of the end wall portion 50c receives closely the portion of the power output shaft 4 axially corresponding thereto, since the inner diameter of the end wall portion 50c is only a little larger than the diameter of the power output shaft at its said portion axially corresponding thereto.

With this construction, therefore, in a similar fashion to what happened in the case of the first preferred embodiment the lubricating oil which is sprayed out in most of the radial directions from the orifices 4e as the power output shaft 4 rotates impinges against the inner surface of the tubular portion 50a of the cover 50 and accumulates therein and then (being barred from rightwards flow by the end wall portion 50c) flows to the left as seen in FIG. 1 towards the ball bearing 6 to pass therethrough into the construction comprising the dog clutch etc. On the other hand, the lubricating oil which is sprayed out in the particular radial directions from the orifices 4e as the power output shaft 4 rotates which cause said lubricating oil to pass through the hole 50f at the top of the tubular portion 50a of the cover 50 instead impinges against the upper inner surface of the projecting portion 1a of the housing 1. A small part of this lubricating oil may in fact drip down back through the hole 50f so as to be returned to within the tubular portion 50a, to flow as before towards and through the ball bearing 6; but almost all of this lubricating oil on the other hand in a similar fashion to the case in the first preferred embodiment trickles down the inner surface of the projecting portion 1a of the housing 1 and accumulates in a pool 60 within said projecting portion 1a. As before, the level of this pool 60 of lubricating oil rises until it reaches the lowest portion of the periphery of the hole 50d in the middle of the end wall portion 50c. This oil pool 60 again reaches so high as to wet the lower part of the bearing 4b which supports the right hand end of the power output member 4a in the projecting portion 1a of the housing 1, and accordingly again provides good and positive lubrication for said bearing 4b. And, since again according to the concept of the present invention the diameter of the power output shaft 4 at the portion thereof axially corresponding to the end wall portion 50c, and accordingly the inner diameter of the end wall portion 50c (i.e. of the circular hole 50d thereof), is substantially less than the diameter of the power output shaft 4 at its portion which is supported by the ball bearing 6, therefore again the level of the oil pool 60 is enabled to be sufficiently high.

Thus, it will be seen that, even at low vehicle speeds and low operating temperatures of the transmission, according to this second preferred embodiment of the present invention good and adequate lubrication of the rear bearing 4b can again be reliably obtained. Again, this prolongs the life of the transmission as a whole, and increases its reliability during use. It will be easily understood that this second preferred embodiment provides a somewhat lesser flow amount of lubricating oil to fill the oil pool 60, since the size of the hole 50f is substantially restricted as compared with the size of the upper opening of the trough defined by the half cylindrical tubular portion 50a of the first preferred embodiment shown in FIG. 6. Either of these constructions may be found to be preferable, depending upon particular circumstances relating to each particular application.

Although the present invention has been shown and described with reference to several preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiments, or of the drawings, but solely by the scope of the appended claims, which follow.

What is claimed is:

1. In combination with a transmission device including a casing elongated towards a power transfer aperture defined therein, a first bearing mounted in said power transfer aperture, a second bearing, a power output member rotatably supported in said power transfer aperture by said first bearing, and a power output shaft within said casing, an outer end of which power output shaft is rotationally coupled to said power output member and an inner portion of which power output shaft is supported from said casing by said second bearing, said power output shaft being formed with an axially extending aperture for receiving supply of lubricating oil and with a radially extending aperture communicating at its radially inward end to said axially extending aperture, for squirting out lubricating oil from said power output shaft in generally radial directions as said power output shaft revolves, a lubricating oil shield cover comprising:

a base portion mounted to said casing at a position close to said second bearing on the side thereof towards said first bearing;

an extension portion elongated from said base portion in the direction of said first bearing and positioned under said power output shaft;

an end wall portion reaching upwards from the end of said extension portion closest to said first bearing towards said power output shaft, with the lowest point of the upper edge of said end wall portion closely approaching the power output shaft at an axial position along said power output shaft at which the diameter of said power output shaft is substantially less than it is at the axial part thereof at which said power output shaft is supported by said second bearing from said casing said extension portion rising on either side of said power output shaft at least to the height of said lowest point of said upper edge of said end wall portion of said lubricating oil shield cover, and said extension portion further having an opening therein at a point not on the lowest part thereof and at an axial position corresponding to the axial position along said power output shaft of said radially extending aperture; and a space for accumulating a pool of lubricating oil ejected from said radially extending aperture in said power output shaft being defined by said lubricating oil shield cover and said casing, so that as lubricating oil accumulates in said space it first can escape therefrom by overflowing over said lowest point of said upper edge of said end wall portion of said lubricating oil shield cover so as to flow to the side of the lower part of said extension portion of said lubricating oil shield cover facing said power output shaft, said lubricating oil pool at such a stage reaching so high as to wet the lower portion of said first bearing.

2. A lubricating oil shield cover according to claim 1, wherein said extension portion is shaped as a trough with the upper side thereof constituting said opening.

3. A lubricating oil shield cover according to claim 1, wherein said extension portion is shaped as a tube with said opening therein at an intermediate axial position therealong.

4. A lubricating oil shield cover according to claim 2, wherein said end wall portion is shaped as a portion of an annulus whose inner circumference closely approaches the outer surface of said power output shaft.

5. A lubricating oil shield cover according to claim 3, wherein said end wall portion is shaped as an annulus whose inner circumference closely approaches the outer surface of said power output shaft.

6. A lubricating oil shield cover according to claim 1, wherein said base portion comprises a portion shaped as a flat annulus.

7. A lubricating oil shield cover according to claim 6, wherein said base portion further comprises a short tubular portion the circumference of one end of which is joined to the outer circumference of said flat annular portion.

8. A lubricating oil shield cover according to claim 7, wherein said short tubular portion of said base portion extends in the direction of said extension portion.

* * * * *